(12) United States Patent
Bhanot et al.

(10) Patent No.: US 9,159,024 B2
(45) Date of Patent: Oct. 13, 2015

(54) REAL-TIME PREDICTIVE INTELLIGENCE PLATFORM

(71) Applicant: INKIRU, INC., Palo Alto, CA (US)

(72) Inventors: Alok Bhanot, Palo Alto, CA (US); Jayashree S. Kolhatkar, Palo Alto, CA (US); Mark Paul Palaima, Saratoga, CA (US); Vijay Raghavendra, Fremont, CA (US); Yitao Yao, Saratoga, CA (US)

(73) Assignee: Wal-mart Stores, Inc., Bentonville, AR (US)

( * ) Notice: Subject to any disclaimer, the term of this patent is extended or adjusted under 35 U.S.C. 154(b) by 298 days.

(21) Appl. No.: 13/708,898

(22) Filed: Dec. 7, 2012

(65) Prior Publication Data

US 2013/0151453 A1    Jun. 13, 2013

Related U.S. Application Data

(60) Provisional application No. 61/567,850, filed on Dec. 7, 2011.

(51) Int. Cl.
*G06N 5/02* (2006.01)
*G06Q 30/02* (2012.01)
*G06Q 10/06* (2012.01)
*G06N 7/00* (2006.01)

(52) U.S. Cl.
CPC .................. *G06N 5/02* (2013.01); *G06N 7/005* (2013.01); *G06Q 10/06375* (2013.01); *G06Q 30/0282* (2013.01)

(58) Field of Classification Search
USPC ......................................................... 706/46
See application file for complete search history.

(56) References Cited

U.S. PATENT DOCUMENTS

2011/0208617 A1 *    8/2011   Weiland ....................... 705/27.1

* cited by examiner

*Primary Examiner* — Jeffrey A Gaffin
*Assistant Examiner* — Nathan Brown, Jr.
(74) *Attorney, Agent, or Firm* — Convergent Law Group LLP

(57) ABSTRACT

A real-time predictive intelligence platform comprises: receiving from a user through a meta API definitions for predictive intelligence (PI) artifacts that describe a domain of an online transaction system for least one business entity, each of the PI artifacts including types, component modules and behavior bundles; exposing an entity API based on the PI artifacts for receiving entity events from the online transaction system comprising records of interactions and transactions between customers and the online transaction system; responsive to receiving an entity event through the entity API, executing the component modules and behavior bundles to analyze relationships found between past entity events and metrics associated with the past entity events, and computing a probabilistic prediction and/or a score, which is then returned to the online transaction system in real-time; and processing entity event replicas using modified versions of the PI artifacts for experimentation.

27 Claims, 12 Drawing Sheets

REAL-TIME PREDICTIVE INTELLIGENCE PLATFORM

CROSS-REFERENCE TO RELATED APPLICATIONS

This application claims the benefit of provisional Patent Application Ser. No. 61/567,850, filed Dec. 7, 2011, assigned to the assignee of the present application, and incorporated herein by reference.

BACKGROUND

Retailers and financial institutions typically collect large amounts of data and use business intelligence and analytics to make sense of the data. As the volume of data being generated and analyzed has increased, so has the need for analyzing this data in real-time. This increasingly data rich environment offers tremendous potential for improving business results by making increasingly data driven decisions. This same growth in data volume, and the growing need to make more decisions more rapidly, is pushing retailers to look at new approaches and technology. Many retailers are adopting predictive analytics to extract more meaning from their data. These mathematical techniques process large amounts of historical data to make predictions about the future. They allow a retailers and financial institutions to make probabilistic predictions, such as how likely is this transaction to be fraudulent, how loyal is this customer, what offer will be most effective at increasing basket size for these customers and more. These predictions, these probabilities, can be used to improve decision-making throughout the organization.

Predictive analytics provides an enhanced view of customers and makes predictions about their current and future transaction behavior. This technique can be applied to a myriad of challenges, including customer segmentation, merchandising optimization, information security, marketplace trust and safety, and buyer fraud. However, within many organizations, the promise of predictive analytics is inhibited by a misalignment between technical and data science resources.

FIG. 1 is a block diagram illustrating a traditional analytic development system and a process for runtime predictive analytics based on offline analytics. The traditional analytics system 100 includes an online transaction system 102, and an off-line system 104. Customers 106 of a business entity buy, sell, or otherwise interact with the business entity's online transaction system 102 through a website 108 or a mobile application 110. The solid arrows indicate the traditional process workflow where the resulting online transaction data is stored in a production database 112, copied to the off-line system 104 for processing. The online transaction data is first extracted, transformed, and loaded (ETL) 114 into a data warehouse 116. A data scientist 118 takes the transformed data and uses different statistical tools 120 to build algorithms 122 in the form of models and scores. Examples of the statistical tools 120 that the data scientist 118 may use include R™, SaS™, MATLAB™, and the like.

Once the data scientist 118 builds the algorithms 122, the algorithms 122 are released to a business developer 124 who must map and recode the algorithms 122 into the entity's business logic of the online transaction system 102. In other words, for every piece of data that the data scientist 118 used to build the algorithms 122, the business developer 124 tries to map the data back to the original transactional data. An application developer 126 must also convert the algorithms 122 written with one of the statistical tools 120 into a language used in the online transaction system 102. The resulting code is then released into the online transaction system 102 for use by the customers 106.

To ensure that the models and scores in the algorithms 122 were created correctly, a validation cycle is performed, shown by the dashed arrows, where the online transaction data is collected again, and the data scientist 118 verifies whether the algorithms 122 are working correctly. If any discrepancies are found, the data scientist 118 notifies the business developer 124. The business developer 124 then corrects the problem in the business logic and the cycle continues. The cycle for a medium size complexity model may take anywhere from 3 to 6 months.

There are number of problems with the traditional analytic development systems. One problem is that the data scientist 118 builds the algorithms 122 in off-line system 104 on transaction data that is extracted, transformed and loaded (ETL) from a production database 112. Therefore, the transaction data on which these algorithms 122 are built is often very different from the transaction data in the online transaction system 102. The data scientist 118 then has to work with the business developer 124 to accurately map the data between the online and off-line systems 102 and 104, resulting in many iterations and long lead times to get the algorithms 122 working in production.

Another problem is that the algorithms 122 are written in a mathematically precise statistical language such as R, SaS, MATLAB, and must be translated into languages such as Java, Python, C++, Ruby, and the like, used to implement the business logic used of the online transaction system 102. That means the algorithms 122 must be reinterpreted from a mathematical precise world into a domain-specific world of the business entity, which is a mismatch. This mismatch results in the data scientist 118 having to work with the business developer 124 to accurately convert the algorithms 122. This process results in many iterations and delays in deploying the algorithms 122 developed by the data scientist 118. The above two problems may be typically referred to as the "life cycle" problem.

Yet another problem with traditional analytic development systems that the software components implementing the system are custom built for a specific type of application or use case (domain). The application, business logic and data base schemas are custom built for each application. This makes it very difficult, if not impossible, for a business entity to share data and analytics about user behavior within various departments of the business entity or across different business entities that want to share data and analytics.

A related problem is that different departments within the same business entity may have separate sets of algorithms 122, which are computed and integrated differently. The reason is because there is no common frame of reference that allows a determination of whether the information and analysis from one set of algorithms 122, such as for a loyalty program, are applicable for another set of algorithms 122, such as fraud or risk. The underlying infrastructure does not support different analytical algorithms to be composed and aggregated in a clean manner; rather each one evolves independently because there is no common metadata model.

Accordingly, it would be desirable to provide an improved analytic development system, referred to herein as a real-time predictive analytics platform.

BRIEF SUMMARY

The exemplary embodiment provides methods and systems for a real-time predictive intelligence platform. Aspects of exemplary embodiment include receiving from a user through a meta API definitions for predictive intelligence (PI) artifacts that describe a domain of an online transaction system for least one business entity, each of the PI artifacts including types, component modules and behavior bundles; exposing an entity API based on the PI artifacts for receiving entity events from the online transaction system comprising records of interactions and transactions between customers and the online transaction system; responsive to receiving an entity event through the entity API, executing the component modules and behavior bundles to analyze relationships found between past entity events and metrics associated with the past entity events, and computing a probabilistic prediction and/or a score, which is then returned to the online transaction system in real-time; and processing entity event replicas using modified versions of the PI artifacts for experimentation.

According to the method and system disclosed herein, the exemplary predictive intelligence platform provides real-time predictive analytics to one or more business entities to enable the business entities to make decisions on business transactions/activities in real-time. The predictive intelligence platform enables the entities to define their domains using metadata, thereby eliminating the need custom software.

DETAILED DESCRIPTION

Figure 1:
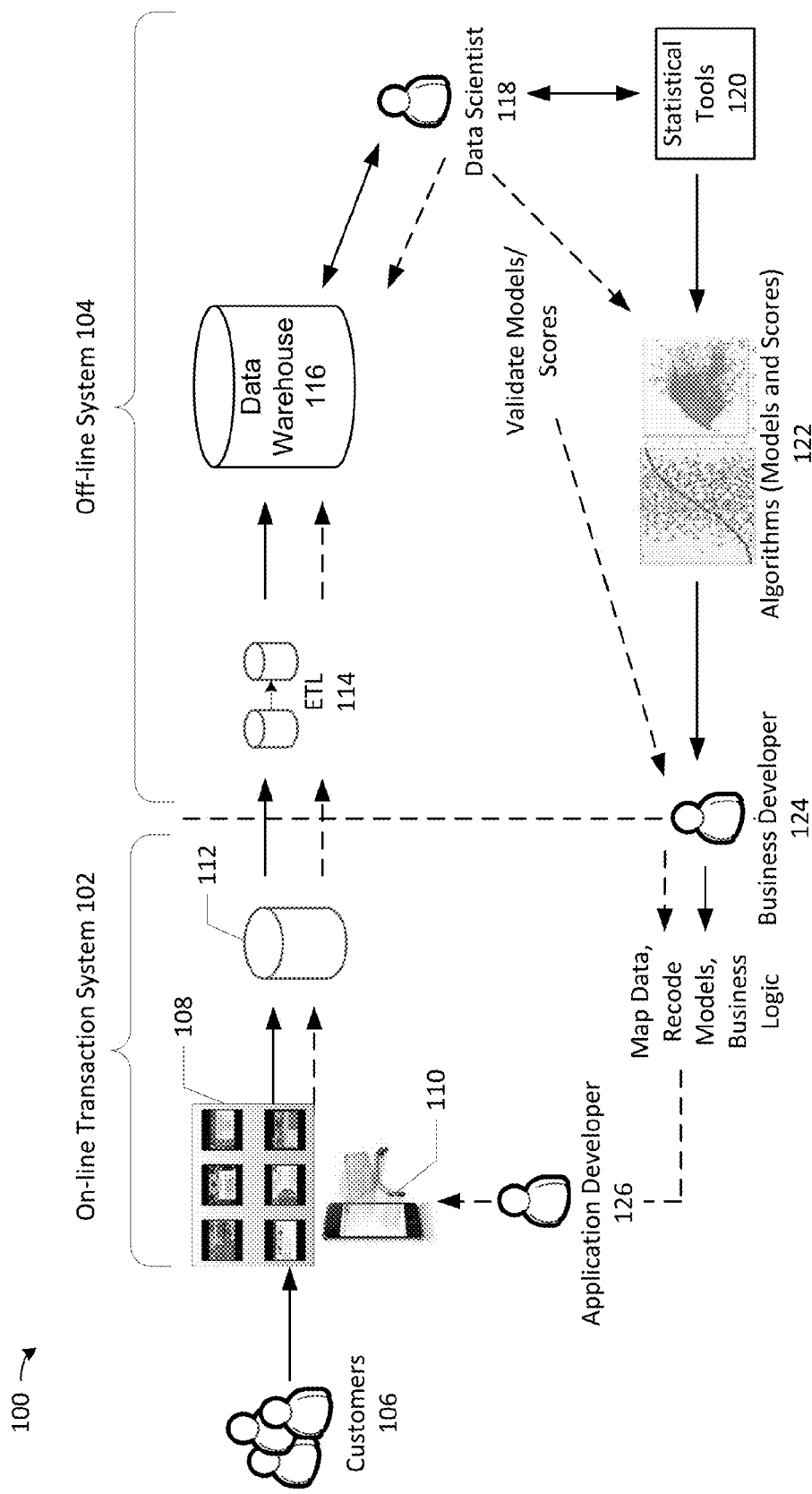
FIG. 1 is a block diagram illustrating a traditional analytic development system and a process for runtime predictive analytics based on offline analytics.

The exemplary embodiment relates to a real-time predictive intelligence platform. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

DEFINITIONS

A business entity refers to an organization that provides an online transaction system for use by customers.

Predictive Intelligence (PI) Platform refers to a metadata-driven web service that provides real-time predictive analytics to one or more business entities to enable the business entities to make decisions on business transactions/activities in real-time and without have to write custom software.

Predictive Intelligence (PI) Artifacts are designed and produced by the business entity and its business operations using the PI platform to capture and represent the business activities from the business entity's online transaction system. The PI platform processes the PI artifacts to provide the business entity information insight and intelligence about the business transactions/activities occurring on the online transaction system.

A Domain is a logical grouping of PI artifacts that provide a clear boundary for applying name-space, security and privacy policies, as well as collaboration policies for each PI artifact group. The business entity can own or describe one or more domains for access and/or for creation of PI artifacts for each domain, and a domain may have zero or more child- or sub-domains.

The exemplary embodiments describe a predictive intelligence platform in form of a metadata-driven web service that provides real-time predictive analytics to one or more business entities to enable the business entities to make decisions on business transactions/activities in real-time. Because the predictive intelligence platform defines the domains of the business entities using metadata, the need for the business entities to write custom software is eliminated.

Figure 2:
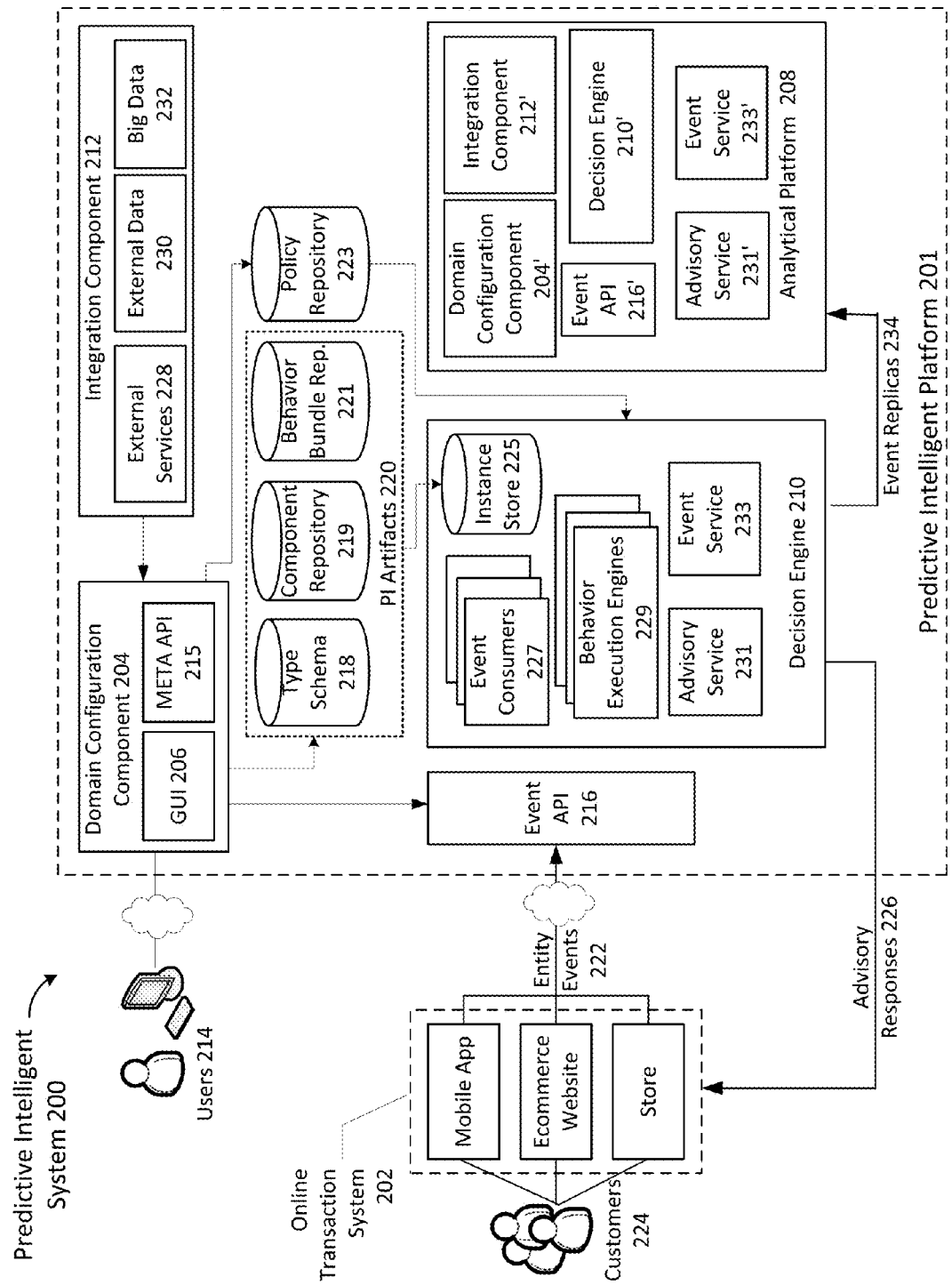
FIG. 2 is a diagram illustrating a predictive intelligence system according to one exemplary embodiment.

FIG. 2 is a diagram illustrating a predictive intelligence system according to one exemplary embodiment. The predictive intelligence system 200 includes a predictive intelligence (PI) platform 201 that comprises any number of application servers, web servers, and database servers (not shown). The PI platform 201 communicates with one or more online transaction systems 202 of one or more business entities over a private or public network, such as the Internet.

The PI platform 201 deploys a metadata-driven system that enables the business entity to dynamically define custom data and event/activity types, relationships, and a programmatic application-programming interface (API) to receive probabilistic predictions about the events occurring on the online transaction system 202 in real time. In one embodiment, the PI platform 201 may include a domain configuration component 204, an analytical platform 208, a decision engine 210, and an integration component 212.

The domain configuration component 204 may include a graphical user interface (GUI) 206 and a meta-API 215. The GUI 206 and/or the meta-API 215 allow users 214, such as scientists and/or domain-business-analysts, to define, manage and monitor full lifecycle (creation, modification and removal) of an event API 216 and predictive intelligence (PI) artifacts 220 for the business entity. The PI artifacts 220 are stored and managed under a domain.

In one embodiment, the PI artifacts 220 may comprise data and event types that may be stored in a type schema 218; component models that may be stored in a component repository 219; behavior bundles that may be stored in a behavior bundle repository 221, and policies that may be stored in a policy repository 223. The data and event types are defined by the user to capture relevant business activities and operations. The component modules are designed and deployed by the user to provide reusable services and analytical models in terms of algorithms and functions, with related data. The behavior bundles are designed and deployed to process entity events, update PI instance data, trigger the updating of analytical models, and to perform predictive computations.

According to one embodiment, after the types in the PI artifacts 220 are created by the users 214, the PI platform 201 may automatically expose a set of corresponding event APIs 216 based on the types in PI artifacts 220. The event API 216 defines how the business entity transmits entity events 222 from the online transaction system 202 into the PI platform 201. In one embodiment, the entity events 222 comprise records of interactions and transactions between the customers 224 and the online transaction system 202. Examples of entity events 222 may include customer logins, page clicks, customer browsing history, and buying and selling information, for instance. The buying and selling information may include an account number, a product ID, a merchant ID, a sales amount, a credit card number, a device ID, an IP address, and the like.

In one embodiment, the GUI 206 is built on top of the Meta API 215, which may include data service APIs and web service APIs. The Meta API 215 allows the users 214 to define the types in the PI artifacts 220, such as data graphs and time-series metrics for analyzing and tracking the entity events, for example. In one embodiment, the GUI 206 includes an advanced integrated development environment (IDE) for the users 214 to design and deploy the component modules and PI behavior bundles in the PI artifacts 220. The GUI 206 may also enable the users 214 to view and analyze business metrics and dashboards, to query and visualize data models, such as the data graphs, and to drill down to runtime predictions and decision choices.

The Integration component 212 provides an extensible plug-in architecture for runtime integration of services. As part of defining the PI artifacts 220, the users 214 may use the integration component 212 to integrate the PI artifacts 220 with external services 228, external data 230, and/or big data 232, some of which may be provided by a third-party provider. Examples of the external services 228 may include analytical and statistical services, (such as R, SAS, etc.), email and address verification services, credit report services, and the like. Examples of the external data 230 may include IP geo-location data, product catalog data, and the like. Examples of the big data 232 may include services such as Mem-Cache, Hadoop, and the like. The external services and data 228 and 230 could be subject to service agreements on pay-for-usage, which may be enforced by PI Platform 201.

The integration component 212 surfaces the external services 228, the external data 230, and/or the big data 232 to the users 214 in a manner in which the users 214 do not have to write scripts to access the data. The external services 228, the external data 230, and the big data 232 may be exposed to the PI platform 201 via the component modules of the PI artifacts 220. The interfaces to access these services and data may be exposed to the IDE of the domain configuration component 204 for the users 214 to reference. The visibility of these services in the GUI 206 may be controlled by policies defined and granted by the business entity.

Once the PI artifacts 220 and the event API 216 are configured for the online transaction system 202, the decision engine 210 is invoked at runtime and begins receiving entity events 222 from the online transaction system 202. The entity events 222 are input to the predictive intelligence platform 201 through the event API 216.

The decision engine 210 may employ one or more event consumers 227, which may be assigned to different processing functionality and/or different entity event types. The event consumers 227 may call one or more behavior execution engines 229 to invoke corresponding behavior bundles; the processing of entity events by the event consumers 227 updates the instances of the types. The decision engine 210 also employs one or more advisory services 231, which may also call the behavior execution engines 229 to analyze the entity events 222 based on the types, behavior bundles, algorithms and models from the component modules defined by the PI artifacts 220

Based on this analysis, the advisory service 231 computes advisory responses 226 for the events, and returns the advisory responses 226 to the online transaction system 202. In one embodiment, the advisory responses 226 may include probabilistic predictions regarding the events, such as a probabilistic prediction of a particular transaction being fraudulent. In one embodiment, the advisory responses 226 may include a score for the entity events 222 in addition to, or instead of, a probabilistic prediction. The business entity may then use the advisory responses 226 to help make business decisions regarding the entity events 222.

In one embodiment, the entity events 222 may also include feedback to the business about the correctness of the advisory responses 226. For example, the business entity may send a notification of whether a chargeback was received for a credit card transaction that was approved by the PI platform 201. The PI platform 201 may use the feedback to modify the PI artifacts 220 and improve future advisory responses. In one embodiment, the feedback regarding the advisory responses 226 is received via the event API 216 in batch. For example, the PI platform 201 may receive a list of charge backs or fraudulent activity for a particular month. In another embodiment, the feedback may be received for single events or transactions. In another embodiment once the business entity defines the PI artifacts 220, the PI platform 201 may receive a large batch of historical event data to populate the newly defined data structures and to compare the live entity events 222 with the historical entity events to calculate the current advisory responses 226.

According to one aspect of exemplary embodiment, the analytics platform 208 maintains replicas of the PI platform 201 components, including a domain configuration component 204', an integration component 212', an event API 216', and a decision engine 210' for handling the "life cycle" problem. In one embodiment, entity events that occur in the online transaction system 202 may be copied and recorded in real time for subsequent played back on the analytical platform 208 in a time compressed way. This allows the users 214 to replay the transactions defined by the entity events at very high speed using experimental versions of the PI artifacts. This allows the users 214 to inject the experimental versions into the decision engine 210 without any downtime without the business entity having to write custom applications.

In one embodiment, the GUI 206, the domain configuration component 204, the analytical platform 208, the decision engine 210, and the integration component 212 may be implemented as software components or as a combination of hardware and software. Although the GUI 206, the domain configuration component 204, the analytical platform 208, the decision engine 210, and the integration component 212 are shown as separate components, the functionality of each may be combined into a lesser or greater number of modules/components. In addition, the components shown in FIG. 2 may be executed by any type and combination of computers and servers that have memory and at least one processor.

Although not shown, the servers and computers comprising the PI platform 201 include hardware components of typical computing devices, including one or more processors, input/output devices, computer-readable media, e.g., memory and storage devices (e.g., flash memory, hard drive, optical disk drive, magnetic disk drive, and the like) containing computer instructions that implement the functionality disclosed when executed by the processor. The servers and the computers may further include wired or wireless network communication interfaces for communication over the network.

Figure 3:
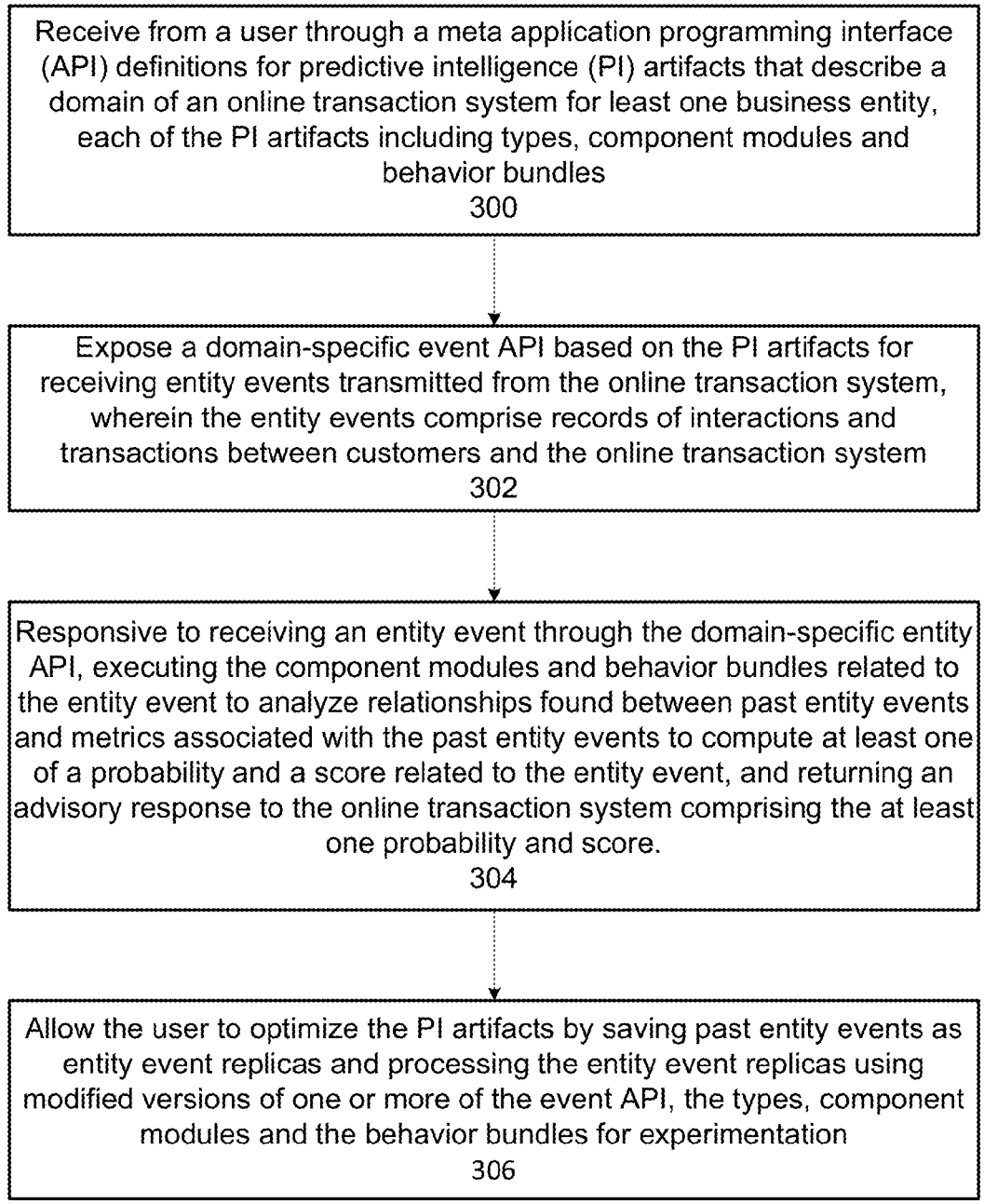
FIG. 3 is a flow diagram illustrating one embodiment of a process performed by the predictive intelligence platform for providing real-time predictive analytics to one or more business entities.

FIG. 3 is a flow diagram illustrating one embodiment of a process performed by the predictive intelligence platform 201 for providing real-time predictive analytics to one or more business entities.

The process may begin by receiving from a user, through the meta application programming interface (API), definitions for predictive intelligence (PI) artifacts that describe a domain of an online transaction system for at least one business entity, each of the PI artifacts including types, component modules, and behavior bundles (block 300).

The domain configuration component 204 automatically creates and exposes the domain-specific event API 216 based on the PI artifacts 220 that will receive entity events 222 transmitted from the online transaction system 202, wherein the entity events 222 comprise records of interactions and transactions between customers and the online transaction system (block 302).

The decision engine 210 is responsive to receiving the entity events 222 through the domain-specific entity API 216, to execute the behavior bundles (and referenced component modules) related to the entity event to analyze relationships found between past entity events and time-series metrics associated with the past entity events to compute at least one of a probabilistic prediction and a score related to the entity event, and to return an advisory response 226 to the online transaction system 202 comprising the at least one of a probabilistic prediction and score (block 304).

The analytical platform allows the user to optimize the PI artifacts by saving past entity events as entity event replicas and processes the entity event replicas using modified versions of one or more of the event API, the types, component modules and the behavior bundles, for experimentation (block 306).

Domain Configuration Component

Figure 4:
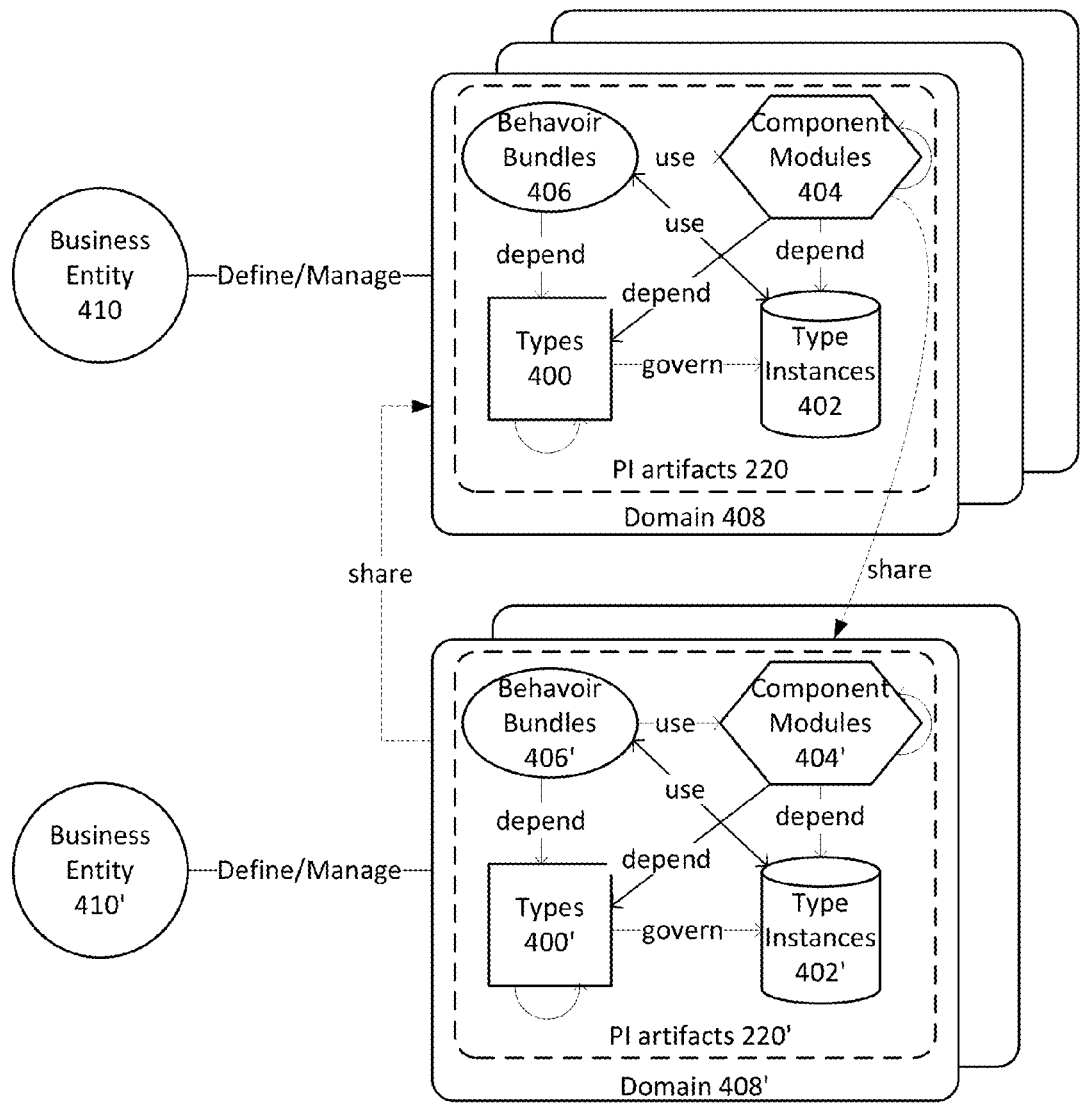
FIG. 4 is a block diagram illustrating components of the PI artifacts and relationships between business entities and domains created using the domain configuration component.

FIG. 4 is a block diagram illustrating components of the PI artifacts 220 and relationships between business entities and domains created using the domain configuration component. According to one embodiment, the PI artifacts 220 may include four major segments: types/schemas (types) 400, type instances 402, component modules 404, and behavior bundles 406.

The data and event types 400 may include, but are not limited to:

Composite data types that support domain-specific ontologies and semantic data for information data models;

Data graphs that capture event data and their network effects;

Time-series metrics definitions that define a temporal summary of business activity segmentation/permutation;

Event scoring types that store up-to-date results from analytical models; and

Advisory response types that represent recommendations based on real-time-prediction and decision models in response to business events;

In one embodiment, the users 214 may define the data and event types 400 under a set of predefined high-level meta categories that govern the definition of event types via the GUI 206 and the meta API 215, using a flexible Schema Definition (Extended JSON Schema) which supports, but not limited to:

Complex Data Structure and Data Types in Schema Definition,

Object Type Referencing in Schema Definition,

Data type value constraint and conversion,

Runtime Schema validation, and

Data attribute/attributes indexing and unique constraint.

In one embodiment, the component modules 404 may include, but are not limited to, a) services that can access local/remote data and/or behaviors, and can be invoked by the behavior bundles 406; and b) analytical models comprising algorithms and functions with related data.

The behavior bundles 406 contain rules and procedures for processing the entity events 222 authored using a PI rule language. The PI rule language and its associated IDE support both declarative and functional programming constructs, which are suitable for the users 214, such as data scientists. The behavior bundles 406 may include, but are not limited to:

Customized flow control for entity event processing;

Defining event processing logic for creating and updating instances of the data graph and time-series metrics;

Designing and applying analytical models that calculate and update data entity scores of the data graphs based on the all related PI data instances;

Real-time prediction and decision logic for providing the advisory responses 226; and Analytical models/algorithms/logic that enable comparison of the quality of the probabilistic predications based on real-time experimentations.

A logical grouping of PI artifacts 220 defines the business domain 408 of a business entity 410, and is fully customizable by the business entity 410 using the PI platform 201. Each business entity 410 may create or associate more than one domain 408. Each domain 408 may have zero or more child domains. According to one embodiment, portions of the domains 408 may be shared between departments of the same business entity 410, or between different business entities 410 and 410' based on policy for data sharing and aggregation, thereby increasing intelligence of the PI platform 201.

Relationships between the segments of the PI artifacts 220 include the following. The data and event types 400 govern type instances 402, which are created and updated by the decision engine 210 during runtime. The component modules 404 depend on both the data and event types 400 and the type instances 402. The behavior bundles 406 depend on the data and event types 400 and use both the component modules 404 and the type instances 402.

Figure 5:
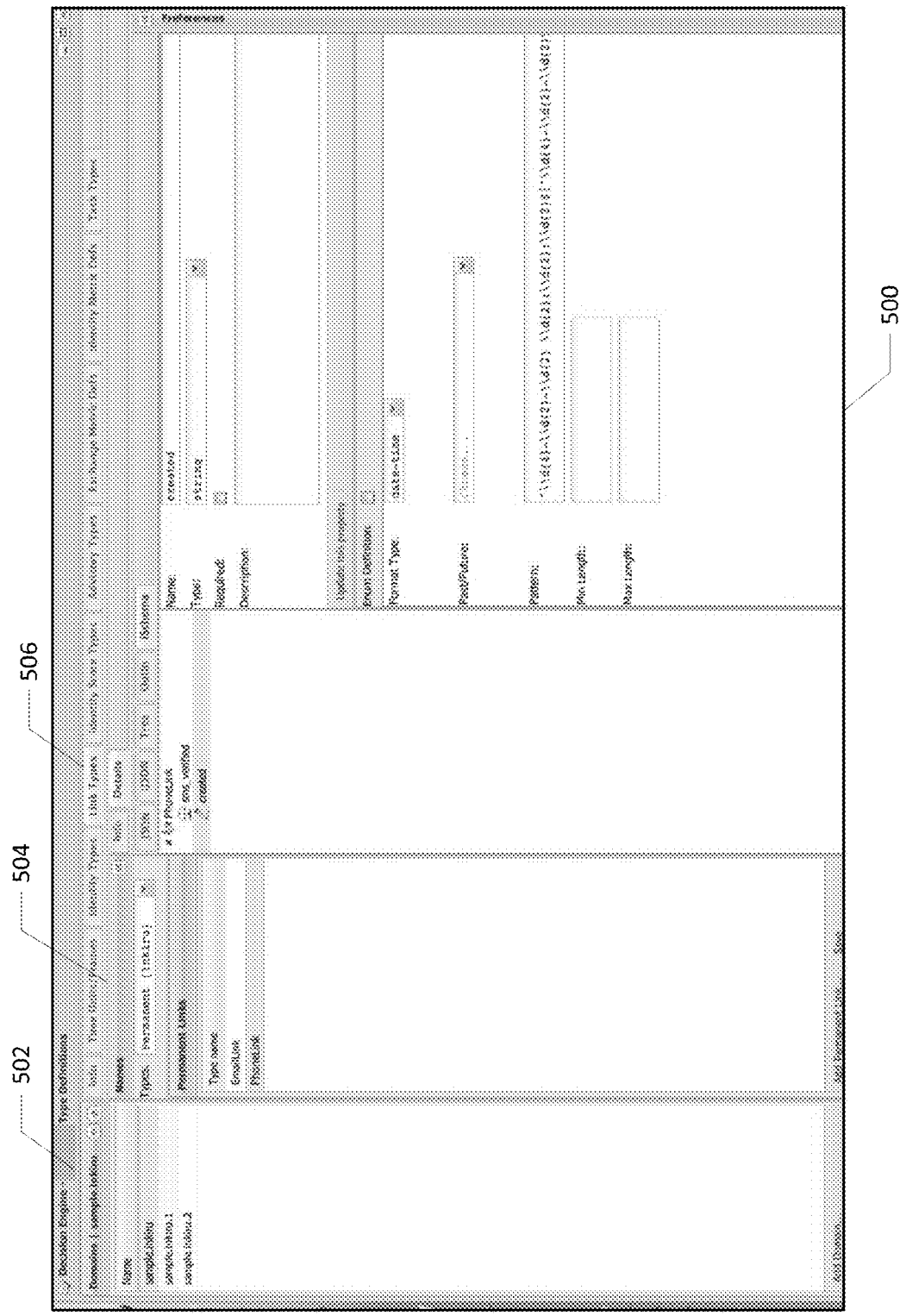
FIGS. 5 and 6 are diagrams illustrating exemplary screenshots of the GUI.
Figure 6:
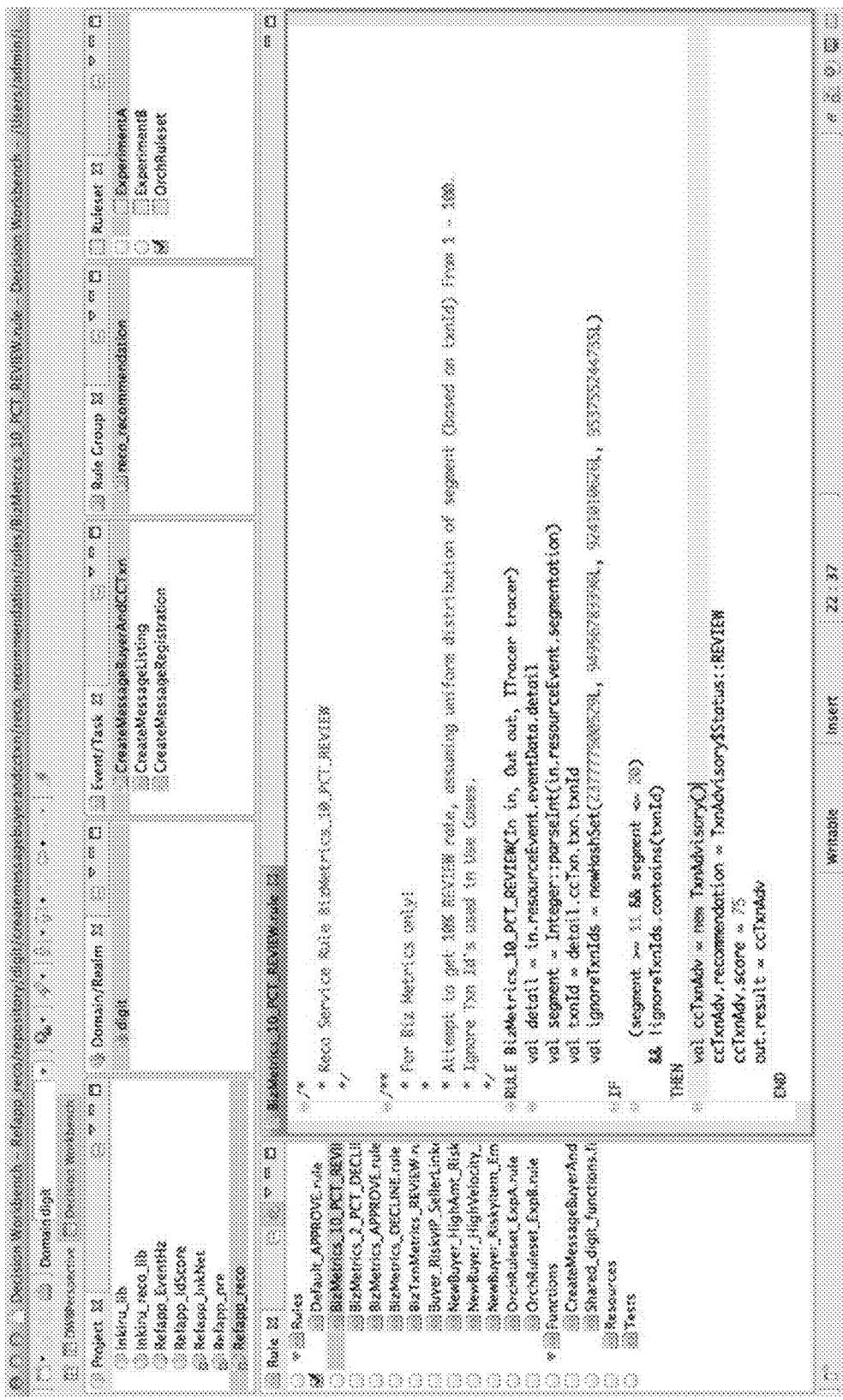

FIGS. 5 and 6 are diagrams illustrating exemplary screenshots of the GUI 206. FIG. 5 shows a sample window 500 for enabling the users 214 to define and deploy the data and event types 400. A left-hand side pane 502 allows the user 214 to select or create a domain. A second pane 504 may allow the user to define relationships called edges or links between the types. The third pane 506 may include several tabs that allow the user 214 to define different types, such as time units, identity node types, edge or link types, score types, advisory types, exchange definitions, and task types. Each tab may include sub-tabs for defining further details about the types.

FIG. 6 shows a sample IDE window 600 for enabling users 214 to define and deploy behavior bundles. The opened tab shows a rule definition in one behavior bundle belonging to particular a domain for providing an advisory response to a specific event type. The IDE uses simplified language constructs (with a sub-set of Java language constructs) to be used by non-programmers, such as, data scientists and business domain experts.

Once the PI artifacts 220 are defined, the domain configuration component 204 automatically exposes the domain-specific event API 216 based on the PI artifacts 220.

Figure 7:
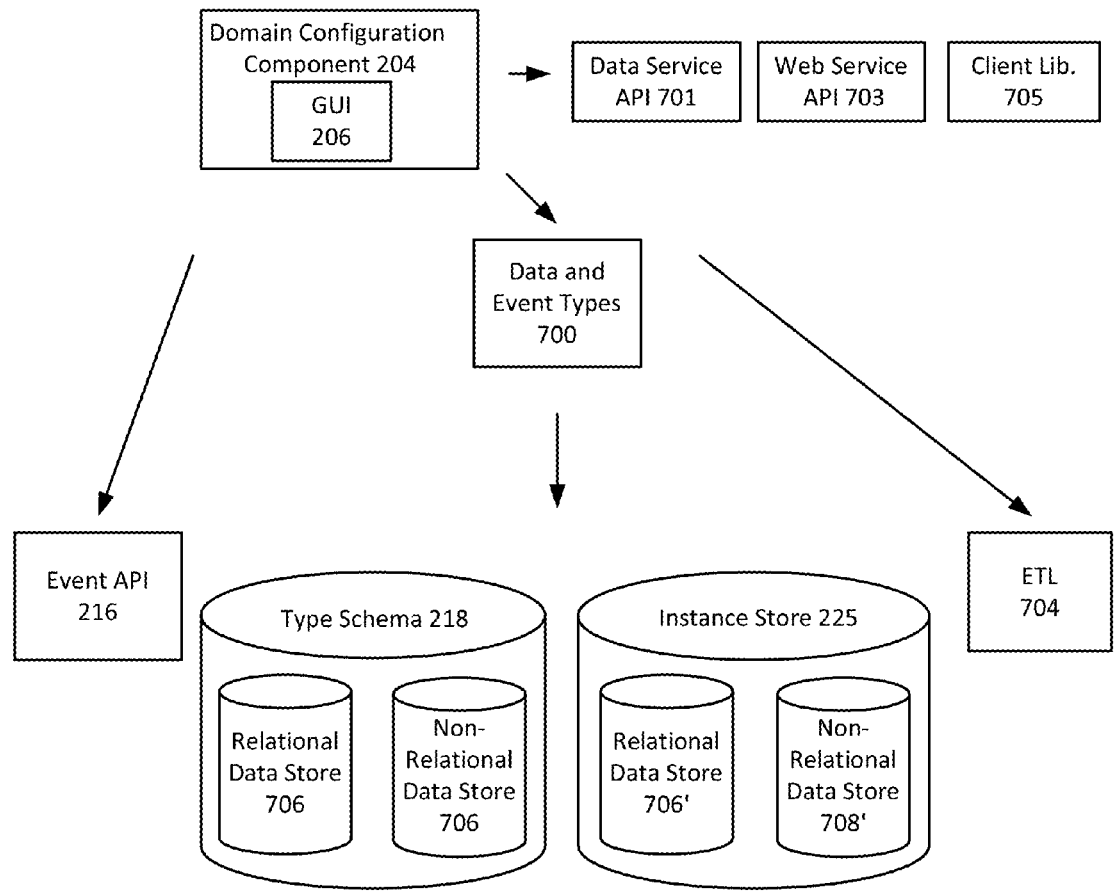
FIG. 7 is a block diagram illustrating a process performed by the domain configuration component when new types are created and defined by the users.

FIG. 7 is a block diagram illustrating a process performed by the domain configuration component 204 when new types are created and define by the users 214, where like components from FIG. 2 have like reference numerals. As stated above, the users 214 may use the GUI 206 to define PI artifacts 220, such as types. For each type defined by the domain configuration component 204, the PI decision engine 201 may expose a set of data service API 701, Web service API 703, and optionally client libraries 705 that allow the users 214 to create and update the instances of PI artifacts. The external services 228 (see FIG. 2) are also exposed automatically by the PI Platform 201 using the data service API 701 and the Web service API 703. The code-generation architecture of domain configuration component 204 supports creation of the client libraries 705 using a custom-preferred program language (such as Java, JavaScript and Perl) for integration with the PI platform 201.

For each new data and event type 700 defined for a domain of a business entity, the domain configuration component 204 may automatically generate a properly-segmented type schema 218 and the type-specific event API 216, which also includes data binding/validation and IDE integration. The domain configuration component 204 may also produce tooling APIs for type-specific ETL 704.

According to an exemplary embodiment, the domain configuration component 204 manages and represents the data and event types 700 in the type schema 218 and in the instance store 225 (which stores instances of the data and event types during runtime) using both a relational data store 706 (e.g., SQL) and a non-relational data store 708 (e.g., dynamic noSQL).

Figure 8:
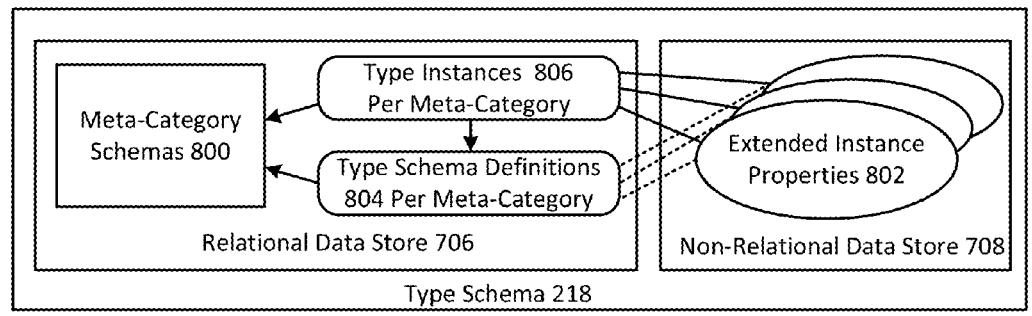
FIG. 8 is a block diagram illustrating a schematic view of data and event types stored in the relational data store and the non-relational data store.

FIG. 8 is a block diagram illustrating a schematic view of data and event types 700 stored in the relational data store 706 and the non-relational data store 708. The meta API 215 (see FIG. 2) includes meta-category-level properties defined by meta-category schemas 800, including data identities and data relationships, which may be modeled in the relational data store 706, while extended instance properties 802 may be modeled in the non-relational data store 708. Type schema definitions 804 for the different data and event types 700 may be governed and stored under different meta-category schemas 800, and the same is true of the type instances 806. However, all extended instance properties 802 stored for each of the type instances 806 may be stored and segmented by each type in the non-relational data store 708, as unstructured data.

In one embodiment, the type instances 806 are all under domain scope. The PI platform 201 further segments the instance store 225 for extended type-level properties by domains. This enables complete removal of domain-specific properties/attributes (represented by 802), while still maintaining the usefulness and the validity of anonymized data entities and relationships (represented by 806), as well as associated entity scores and activity matrixes, which reference type instances 806.

Accordingly, the data is structured at a category level, but non-structured at entity level. This enables heterogeneous sub-graphs from different domains to be connected.

Data Graph of Information Network

To support effective analytical models on fraud, risk, reputation and advisories, a comprehensive information network is required. However, traditional graph representations of social networks (such as P2P networks, mobile computing and online communities, and the like) are generally isolated to the respective domains. The unique implementation of each network makes it difficult to join them together to form a super-set network of greater value.

According to another aspect of the exemplary embodiment, the PI platform 200 provides an extensible multi-cross-domain information network that is meta-data-driven to overcome the deficiencies of traditional social network approaches. The information network provides a foundation for building reliable reputation, risk management, advisory, promotion and other services that depend on a comprehensive identity network.

The information network of the exemplary embodiment may be implemented as an information data graph, which is defined as one of the data and event types 400. The data graph includes nodes (such as customers, products, merchants and the like), edges or links connecting the nodes, which represent relationships between the nodes, and indexes for data graph traversal and retrieval.

Figure 9:
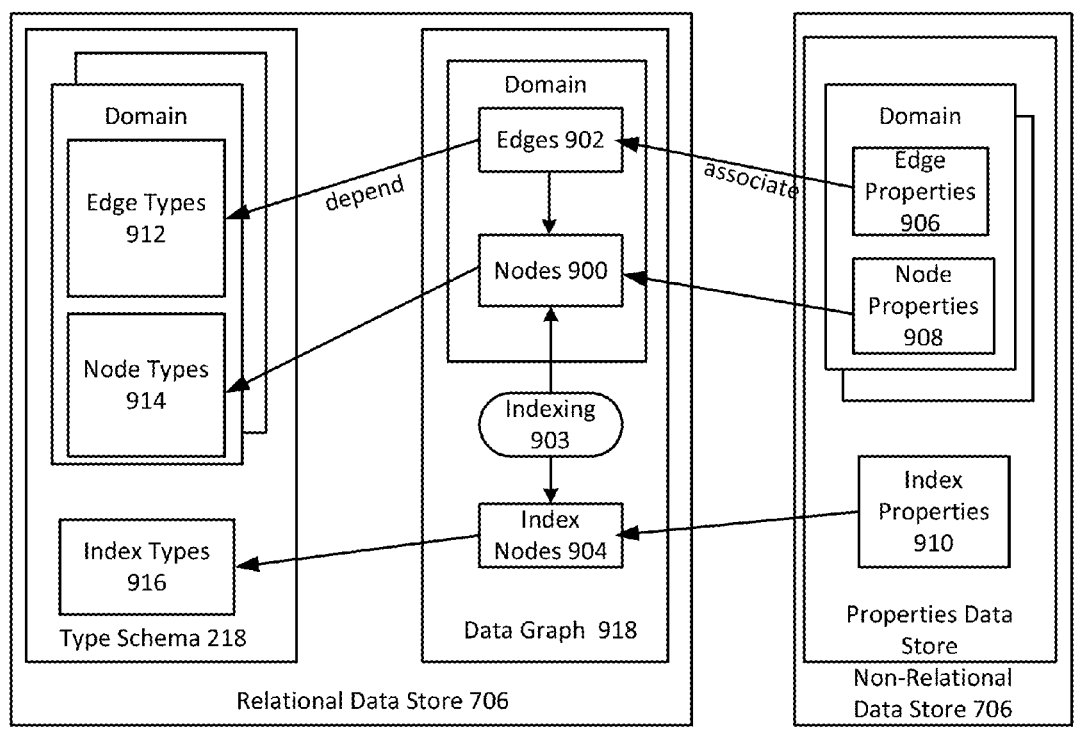
FIG. 9 is a diagram illustrating a logical view of a persistence store for an information data graph.

FIG. 9 is a diagram illustrating a logical view of a persistence store for an information data graph. It is a specific realization of FIG. 8. In one embodiment, the relational data store 706 is used to store the information data graph 918, which may comprise anonymized nodes (identities) 900, edges 902 connecting or linking the nodes 900 and index nodes 904 that act as a key for searching the nodes. Attributes of the nodes 900, edges 902 and index nodes 904 are stored as node properties 906, edge properties 908, and index properties 910, respectively, in the non-relational database 708, which enable both efficient graph traversal and flexible attribute-based query for both the nodes 900 and edges 902. The nodes 900 depend from node types 912, the edges 902 depend from edge types 914, and the index nodes 904 depend from the index types 916. The types 912, 914, 916 are realizations of 804, the instances 900, 902, 903, 904 are realizations of 806, the extended data objects 906, 908 and 910 are realizations of 802.

As can be seen in FIG. 9, the PI platform 201 completely segments the data store for domain-node properties and domain-specific edge properties. This enables privacy and data sharing policy for cross-domain access.

Figure 10:
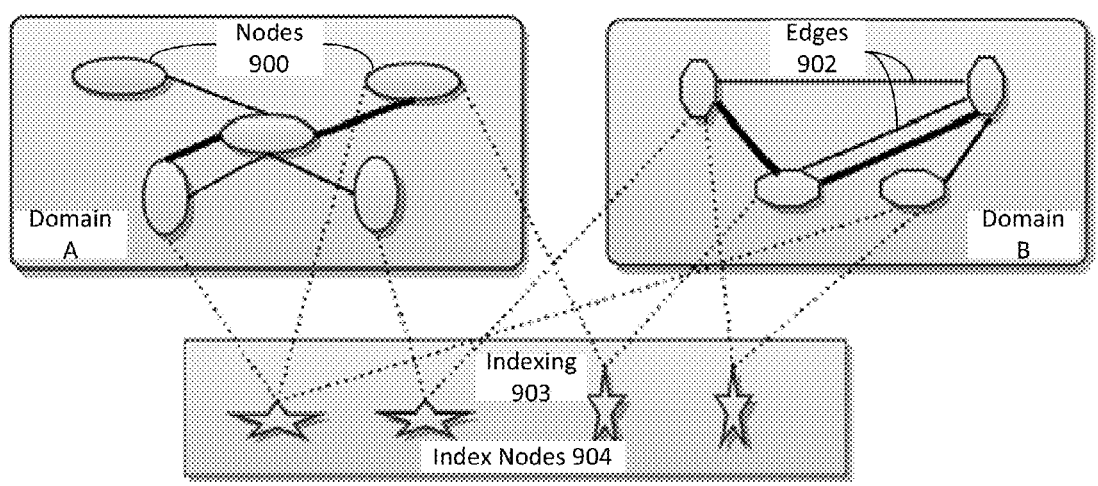
FIG. 10 is a pictorial representation of a data graph, where nodes and edges are segmented by domains.

FIG. 10 is a pictorial representation of a data graph, where nodes and edges are segmented by domains. Domain A and domain B each includes a data graph comprising nodes 900 and edges 902 that connect the nodes 900. An indexing process 903 (see FIG. 9) has created an index of index nodes 904 that spans both domains A and B.

Even with complete removal of domain-specific edge/node properties of one domain or business entity, the PI platform 201 may still use the anonymized data graph to gain valuable insight for other business entities from its network effects. For example, anonymized identities (nodes) and relationships (edges) from other domains and their associated node rankings and scoring as well as behavior matrices, can provide valuable information to enhance the analytical model of any given domain. According to the exemplary embodiment, the data graphs can be defined, extended and integrated via metadata definitions without programmatic modifications of the PI platform 201.

Runtime Processing

As described in FIG. 3, after the PI artifacts 220 are defined in step 300 and the domain-specific entity API 216 is automatically created in step 302, the decision engine 210 computes and returns an advisory response 226 containing probabilistic prediction and/or a score related to the entity event to the online transaction system 202 during runtime.

According to one embodiment, the PI platform runtime process is a sequence of processing steps performed in response to an entity event 222 or a stream of entity events 222 submitted to the PI platform 201, where PI artifacts 220 are analyzed to produce an optimal synchronous or asynchronous advisory response to the entity event, and PI artifacts 220 are updated/maintained in response to the entity event to increase the intelligence of the PI platform 201 so as to provide more optimal advisory responses to future entity events.

The runtime process of the decision engine 210 may support a distributed processing model, where event consumers 227 process live instances of the PI artifacts and support the execution of the behavior bundles, which contain rules and procedures for processing the entity event. The rules and procedures in the behavior bundles query and update the data models defined in the PI artifacts and invoke PI component modules.

Figure 11:
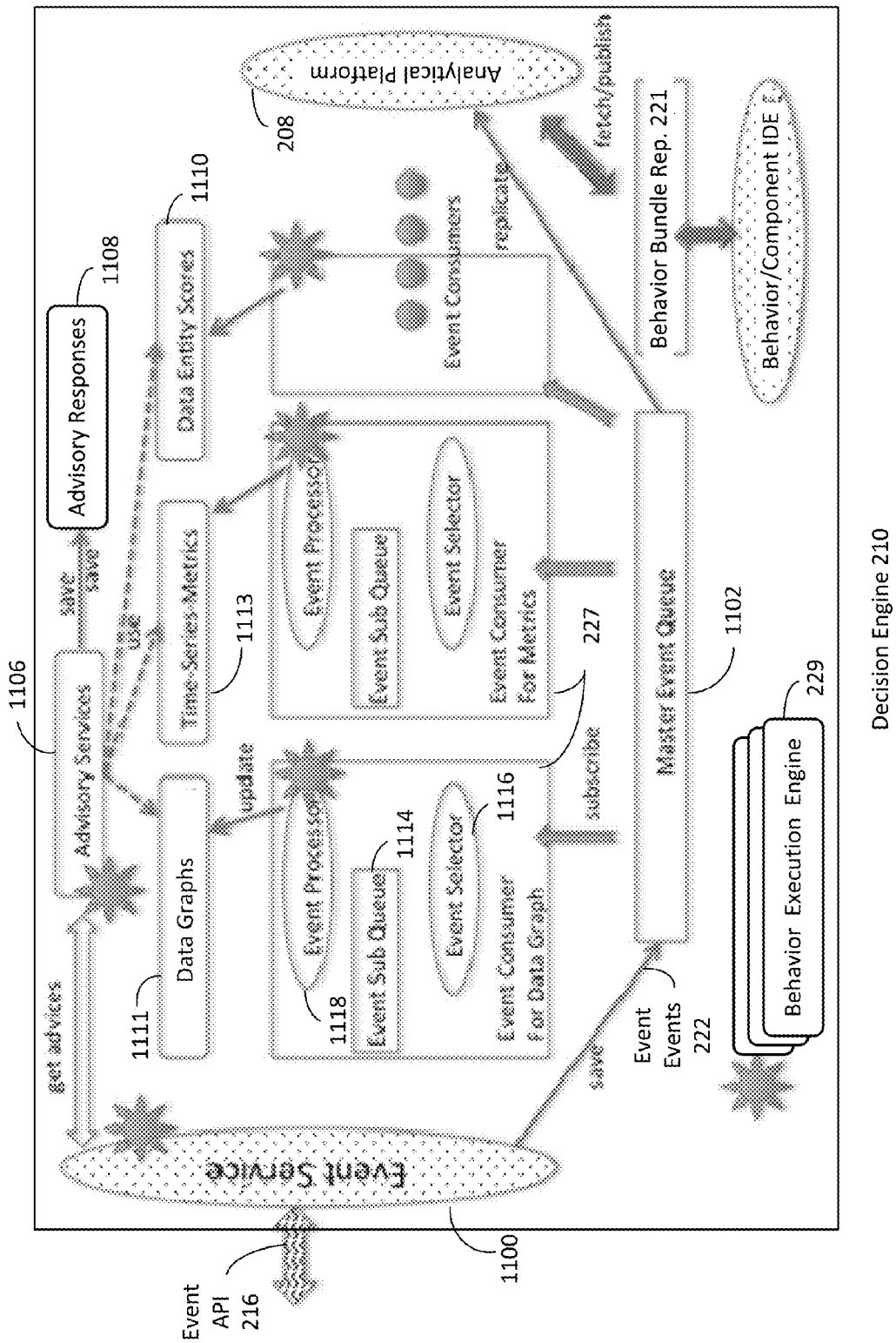
FIG. 11 is a block diagram illustrating a portion of the decision engine sub-systems responsible for event processing.

FIG. 11 is a block diagram illustrating a portion of the decision engine 210 sub-systems responsible for event processing, where like components from FIG. 2 have like reference numerals. Sub-systems of the decision engine 210 may include an event service 1100, a master event queue 1102, event consumers 227, behavior execution engines 229, and advisory services 1106.

The event service 1100 may handle all events entered into PI system via the event API 216. The event service 1100 initiates a set of processing sequences by the decision engine 210 to process an entity event 222 and/or produce an advisory response 226. In one embodiment, both transactional and task activity may enter the PI platform via the Entity API 2216 or driver. Invocation of the entity API 216 for transactional activity create entity events, while discrete activities, such as file upload of data/instructions that invoke the entity API 216 may create tasks. In one embodiment, the processing of entity events may occur in real or near-real time, while task processing may occur according to a schedule (once or periodic).

All events are saved into the master event queue 1102 to support distributed event stream processing. According to one aspect of the exemplary embodiment, different event consumers 227 are provided to process the same entity event 222 for different purposes; those event consumers 227 could be further split to handle different types of entity events 222 for parallel processing.

Entity event 222 processing by the event consumers 227 results in computation of data entity scores 1110 and advisory responses 1108, and subsequent updates to instances of the PI artifacts including the data graphs 1112, the time-series metrics 1113 and the data entity scores 1110. These updates are governed by the insight gathered from the analytical platform 208 and executed by the PI runtime via defined and deployed rules and procedures in the behavior bundles.

Each entity event 222 can be subscribed and processed by one or more event consumers 227, where each event consumer 227 comprises:

An event sub-queue 1114 that holds a sub-set of entity events from the master event queue 1102 for processing by the event consumer 227;

An event selector 1116 that selects only relevant entity events from the master event queue 1102 for storage in an event sub-queue 1114;

An event processor 1118 that process the selected entity events in the event sub-queue 1114 by calling a behavior execution engine 1120 to execute a set of the behavior bundles. The star symbols in FIG. 11 denote the possible execution locations for the behavior bundles by the behavior execution engine 229. The number of event consumers 227 that are used can be scaled up based on functionalities and data domains, which may provide reliability, flexibility and scalability.

By default, all event consumers 227 can process entity events 222 independently. However, entity event stream processing can support processing order among the event consumers 227. For example, an event consumer responsible for generating the data graphs 1111 and the time-series-metrics 1113 may process independent of each other, but processing by the event consumer responsible for generating the data entity scores 1110 may be dependent on the aforementioned two event consumers.

The advisory services 1116 uses the data graphs 1111, the time series metrics 1113, and the data entity scores 1110 to generate the advisory responses 1108, which are saved and also sent back to requestor via the event service 1100 and the entity event API 216.

In one embodiment, a replica of the master event queue 1102 may be sent to the analytical platform 208 to able the users to replay production versions of the entity events within the analytical platform 208. The usage of the IDE and the behavior bundle repository 221 of behavior bundles, in both production and in the analytical platform, enables the users 214 (domain data scientists) to promote and demote analytic models and processing logic based on offline analytics provided by the analytics platform 208.

Figure 12:
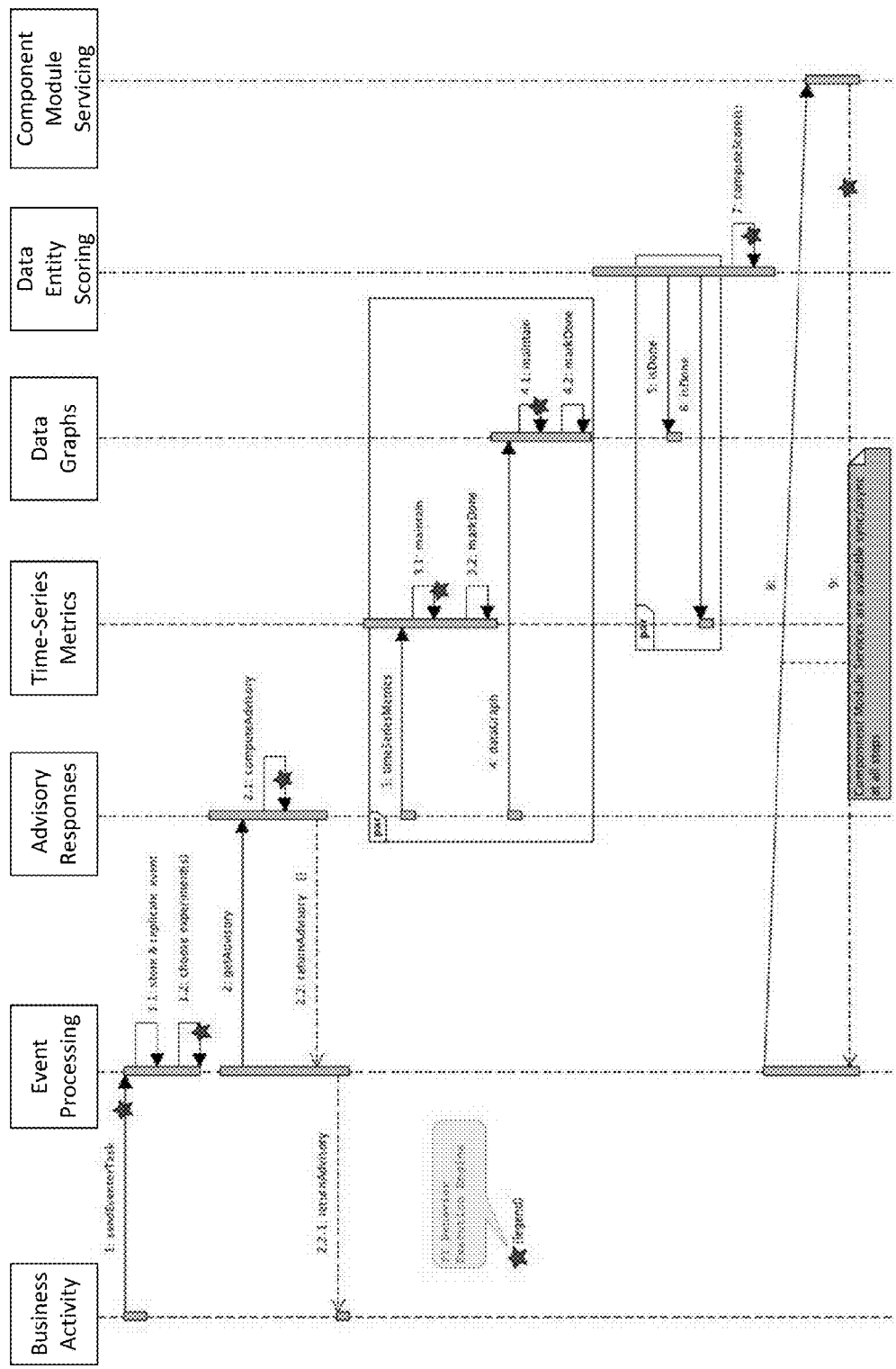
FIG. 12 is a diagram illustrating an exemplary event processing time sequence by decision engine shown in FIG. 11.

FIG. 12 is a diagram illustrating an exemplary event processing time sequence by decision engine 210 shown in FIGS. 2 and 11. The process may begin when a business activity is received by the PI platform 201 as an entity event (time 1) and is stored for asynchronous event stream processing, and also replicated to the analytical platform 208 (time 1.1). The behavior bundles could be invoked to determine which experimental segmentation this event should belong to (time 1.2), therefore, all subsequent event processing by the decision engine could choose proper experimental behavior bundles. The event service 233 calls the advisory service 1106 for computation of the advisory response (times 2 through 2.2). The advisory response for the event may be computed by the rules and procedures defined by the behavior bundles for the type of entity event based on current event data and existing data, such as, the data graph, the time-series-metrics and entity event scores. The event consumers 227 process the entity event after the advisory response is computed. The event processing for the data graph and time-series-metrics can be done in parallel after the advisory response is returned (times 3 through time 7). Entity event scoring may not start until event processing for data graph and time-serials-metrics are done (times 5 through 7). During the behavior bundle execution by the execution engine (times 2 to 7—shown by the stars), component modules could be invoked (steps 8 and 9).

PI artifact updating/maintenance and processing flow are bound to compute and store units in a given deployed environment. Configuration may control this binding and can be changed during system execution for performance and/or scaling requirements. The PI Process supports experimentation, which allows multiple named groups of PI artifacts to be evaluated during event processing and the tracking of impacted PI artifacts from those behaviors.

Figure 13:
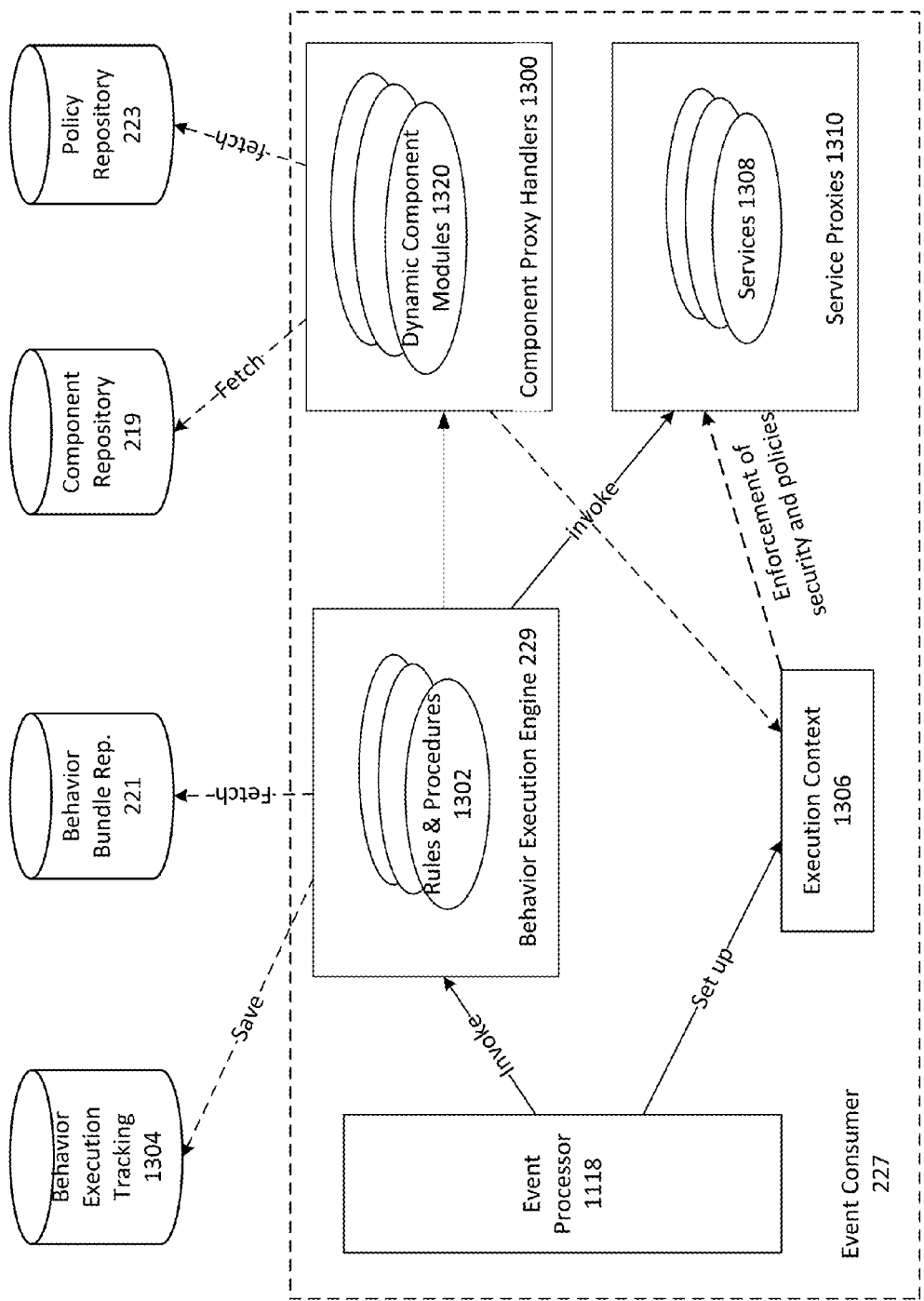
FIG. 13 is a block diagram illustrating the runtime processing of the event consumers and the behavior execution engines in further detail.

FIG. 13 is a block diagram illustrating the runtime processing of the event consumers and the behavior execution engines in further detail. In response to receiving an entity event, the event processor 1118 may call the execution context 1306 to set proper execution context before execution an entity's behavior bundles. Execution context 1306 may be used by component proxy handlers 1300 and service proxies 1310 to enforce security and policies, when component modules 1320 and services 1308 are invoked by behavior bundles 1302 at runtime The event processor 1118 is also responsible for invoking one or more behavior execution engines 229. Each of the behavior execution engines 229 is responsible for loading a proper sub-set of rules and procedures 1302 from the behavior bundles stored in behavior bundle repository 221, as well as dependent component modules from the component repository 219.

The behavior bundles may be categorized into functions, procedures and rules, which can be designed by the users, e.g., data scientists and domain experts. The behavior bundles may be deployed dynamically at runtime. The procedures and rules are executed by the execution engine including any arguments. Functions can be invoked with or without arguments and return a value. All categories of behavior bundles can invoke functions with/without arguments; and the functions return a value. The order of rule execution can be declared, and the execution of the rules and procedures 1302 (e.g. paths and decisions) may be tracked by framework and saved in a behavior execution tracking repository 1304.

The event consumer 227 uses component proxy handlers 1300 to load processing logic in the form of dynamic component modules 1320 to enforce the usage permission, billing and metering. The event consumer 227 runtime process supports dynamic deployment/re-deployment of the component modules 1320, which contain services that can be invoked by the behavior bundles to access local/remote data and/or behaviors, as well as algorithms. In one embodiment, different versions of the component modules 1320 may be developed and managed under their principal domain. Usage of the component modules 1320 during both configuration and runtime are governed through policies, which are enforced by the PI platform's IDE and runtime proxies 1300, 1310. In one embodiment, different versions of the component modules 1320 can be deployed to the same event consumer 227 runtime, to be accessed by different domain behavior bundles. The runtime services 1308 provide full life-cycle support, such as configuration, initialization and tear down.

Analytical Platform

According to a further aspect of the exemplary embodiment, the analytical platform, shown in FIG. 2, allows the user to optimize the PI artifacts by processing entity event replicas executing modified versions of the PI artifacts for offline experimentation and discovery. As described above, the analytical platform 208 comprises a copy of the execution environment of the PI platform 201 for extended experimental support. This also provides the ability to save "snapshots" of the execution environment for reuse. Experimental capabilities of the PI platform 201 include the following:

Definition—the ability to group behavior PI-artifacts into named experiments.

Vectoring—the ability to define the runtime event flow to interact with one or more experiments and what percentage of event processing each experiment should process.

Replay—the ability to replay all (or segments of) the past entity events to drive local PI processing.

Results capture—the ability to observe and review modified and/or generated PI-artifacts per experiment.

Results analysis—the ability to enable comparison analysis across one or more experiments to identify the modified PI artifacts that contribute to optimized predictive results.

Promote/Demote—the ability to promote top-performing PI artifacts and demote or replace sub-optimal PI artifacts into/from other PI platforms 201 and/or analytical platforms 208.

The major steps of experimentation—Definition, Vectoring, Results capture, Results analysis and Promote/Demote also can all be directly performed in either the analytical platform 208 or during runtime of the PI platform 201 to process the entity events 222.

Processing or "replaying" the entity event replicas on the analytics platform 208 using modified versions of the PI artifacts 220' allows the users to experiment with and optimize the PI artifacts 220' defined for the entity. For example, six months of entity events may be replayed using experimental PI artifacts (including types, data graphs, time-series metrics, rules and procedures, and scores) to determine which combination of components comprising the experimental PI artifacts 220' and event API 216 perform best. Top-performing components can then be promoted into the PI platform 201, and underperforming components can be demoted from the PI platform 201 without any downtime. The users 214 can thus push the desired combination of components from the experimental PI artifacts 220' and the event API 216' to the production environment, all without having to write any code.

A method and system for providing a real-time predictive intelligence platform has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD/BD and is to be executed by one or more processors. Accordingly, many modifications may be made by one of ordinary skill in the art without departing from the spirit and scope of the appended claims.

We claim:

1. A computer-implemented method for providing a predictive intelligence platform, comprising:

receiving from a user through a meta application programming interface (API) definitions for predictive intelligence (PI) artifacts that describe a domain of an online transaction system for at least one business entity, each of the PI artifacts including types, component modules and behavior bundles;

exposing a domain-specific entity API, based on the PI artifacts, for receiving entity events from the online transaction system, the entity events comprising records of interactions and transactions between customers and the online transaction system;

responsive to receiving an entity event through the domain-specific entity API, executing the component modules and behavior bundles related to the entity event to analyze relationships found between past entity events and metrics associated with the past entity events to compute at least one of a probabilistic prediction and a score related to the entity event, and returning an advisory response to the online transaction system comprising the at least one of a probabilistic prediction and score so the at least one business entity can use the advisory responses to make business decisions regarding the entity events; and allowing the user to optimize the PI artifacts by saving past entity events as entity event replicas and processing the entity event replicas using modified versions of one or more of the event API, the types, component modules and the behavior bundles for experimentation.

2. The method of claim 1, wherein the types include:

composite data types that support domain-specific ontologies and semantic data for information data models;

data graphs that capture event data and their network effects;

time-series metrics definitions that define a temporal summary of business activity segmentation/permutation;

data entity scoring types that store up-to-date results from analytical models; and advisory response types that represent recommendations based on real-time-prediction and decision models in response to business events.

3. The method of claim 2, wherein the component modules include:

services that access local or remote data and that are invoked by the behaviors bundles; and analytical models comprising algorithms and functions with related data.

4. The method of claim 2, wherein the behavior bundles include rules and procedures comprising:

customized flow control for entity event processing;

defining event processing logic for creating and updating instances of the data graph and time-series metrics;

designing and applying analytical models that calculate instances of the entity scores based on the data types;

real-time prediction and decision logic for providing the advisory responses; and analytical models/algorithms/logic that enable comparison of the quality of the probabilistic predications based on real-time experimentations.

5. The method of claim 2, further comprising logically grouping PI artifacts to define different domains for a plurality of business entities, wherein each of domains has zero or more child domains, and portions of the domains are shared between departments of a same business entity or between different ones of the business entities.

6. The method of claim 1, further comprising storing the types in a type schema comprising both a relational data store and non-relational data store, wherein data identities and data relationships are modeled in the relational data store, extended instance properties are modeled in a non-relational data store.

7. The method of claim 6, further comprising segmenting the type schema for extended type-level properties by domains to enable complete removal of domain-specific properties/attributes while maintaining validity of anonymized data entities and relationships.

8. The method of claim 7, further comprising using the relational data store to store the data graphs as anonymized nodes, edges connecting the nodes, and an index for the nodes, and using the non-relational data store to store attributes of the notes, edges, and index nodes.

9. The method of claim 1, wherein executing the component modules and behavior bundles further comprises processing live instances of the PI artifacts and executing rules and procedures defined by the behavior bundles.

10. The method of claim 1, wherein executing the component modules and behavior bundles further comprises computation of data entity scores, and updates to instances of the PI artifacts, including data graphs, time-series metrics, and the data entity scores.

11. The method of claim 1, wherein executing the component modules and behavior bundles further comprises saving the entity events in a master event queue;

subscribing one or more event consumers to process the entity events, where each of the event consumers comprises:

an event selector that selects relevant entity events from the master event queue for storage in an event sub-queue; and an event processor that processes the selected entity events in the event sub-queue by calling a behavior execution engine to execute a set of the behavior bundles, wherein a number of event processor that are used may be scaled based on the domain.

12. The method of claim 11, further comprising: utilizing a processing order for the event consumers, wherein first and second type of event consumers responsible for generating data graph and time-series metrics operate independently, but processing by a third type of event consumers responsible for generating data entity scores is dependent on the first type of event consumers.

13. The method of claim 1, wherein allowing the user to optimize the PI artifacts further comprises:

providing the user with the ability to promote top-performing PI artifacts and demote or replace sub-optimal PI artifacts from other PI platform.

14. A predictive intelligence (PI) platform, comprising:

one or more of servers for communicating with an online transaction system of a business entity;

a meta application programming interface (API) that receives from a user definitions for predictive intelligence (PI) artifacts, the PI artifacts describing a domain of the online transaction system for the business entity, wherein each of the PI artifacts includes types, component modules and behavior bundles;

a domain-specific entity API, exposed from the PI artifacts, for receiving entity events from the online transaction system, the entity events comprising records of interactions and transactions between customers and the online transaction system;

a decision engine responsive to receiving an entity event through the domain-specific entity API that executes the component modules and behavior bundles related to the entity event to analyze relationships found between past entity events and metrics associated with the past entity events to compute at least one of a probabilistic prediction and a score related to the entity event, and to return an advisory response to the online transaction system comprising the at least one of a probabilistic prediction and score so the business entity can use the advisory responses to make business decisions regarding the entity events; and an analytical platform that allows the user to optimize the PI artifacts by saving past entity events as entity event replicas and processing the entity event replicas using modified versions of one or more of the event API, the types, component modules and the behavior bundles for experimentation.

15. The PI platform of claim 14, wherein the types include:
composite data types that support domain-specific ontologies and semantic data for information data models;
data graphs that capture event data and their network effects;
time-series metrics definitions that define a temporal summary of business activity segmentation/permutation;
data entity scoring types that store up-to-date results from analytical models; and
advisory response types that represent recommendations based on real-time-prediction and decision models in response to business events.

16. The PI platform of claim 15, wherein the component modules include:
services that access local or remote data and that are invoked by the behaviors bundles; and
analytical models comprising algorithms and functions with related data.

17. The PI platform of claim 15, wherein the behavior bundles include rules and procedures comprising:
customized flow control for entity event processing;
defining event processing logic for creating and updating instances of the data graph and time-series metrics;
designing and applying analytical models that calculate instances of the entity scores based on the data types;
real-time prediction and decision logic for providing the advisory responses; and
analytical models/algorithms/logic that enable comparison of the quality of the probabilistic predications based on real-time experimentations.

18. The PI platform of claim 15, further comprising logically grouping PI artifacts to define different domains for a plurality of business entities, wherein each of domains has zero or more child domains, and portions of the domains are shared between departments of a same business entity or between different ones of the business entities.

19. The PI platform of claim 14, further comprising storing the types in a type schema comprising both a relational data store and non-relational data store, wherein data identities and data relationships are modeled in the relational data store, extended instance properties are modeled in a non-relational data store.

20. The PI platform of claim 19, further comprising segmenting the type schema for extended type-level properties by domains to enable complete removal of domain-specific properties/attributes while maintaining validity of anonymized data entity events and relationships.

21. The PI platform of claim 20, further comprising using the relational data store to store the data graphs as anonymized nodes, edges connecting the nodes, and an index for the nodes, and using the non-relational data store to store attributes of the notes, edges, and index nodes.

22. The PI platform of claim 14, wherein executing the component modules and behavior bundles further comprises processing live instances of the PI artifacts and executing rules and procedures defined by the behavior bundles.

23. The PI platform of claim 14, wherein executing the component modules and behavior bundles further comprises computation of data entity scores, and updates to instances of the PI artifacts, including data graphs, time-series metrics, and the data entity scores.

24. The PI platform of claim 14, wherein executing the component modules and behavior bundles further comprises
saving the entity events in a master event queue;
subscribing one or more event consumers to process the entity events, where each of the event consumers comprises:
an event selector that selects relevant entity events from the master event queue for storage in an event sub-queue; and
an event processor that processes the selected entity events in the event sub-queue by calling a behavior execution engine to execute a set of the behavior bundles, wherein a number of event processor that are used may be scaled based on the domain.

25. The PI platform of claim 24, further comprising: utilizing a processing order for the event consumers, wherein first and second type of event consumers responsible for generating data graph and time-series metrics operate independently, but processing by a third type of event consumers responsible for generating data entity scores is dependent on the first type of event consumers.

26. The PI platform of claim 14, wherein allowing the user to optimize the PI artifacts further comprises:
providing the user with the ability to promote top-performing PI artifacts and demote or replace sub-optimal PI artifacts from other PI platform.

27. An executable software product stored on a computer-readable medium containing program instructions for providing a predictive intelligence platform, the program instructions for:
receiving from a user through a meta application programming interface (API) definitions for predictive intelligence (PI) artifacts that describe a domain of an online transaction system for at least one business entity, each of the PI artifacts including types, component modules and behavior bundles;
exposing a domain-specific entity API, based on the PI artifacts, for receiving entity events from the online transaction system, the entity events comprising records of interactions and transactions between customers and the online transaction system;
responsive to receiving an entity event through the domain-specific entity API, executing the component modules and behavior bundles related to the entity event to analyze relationships found between past entity events and metrics associated with the past entity events to compute at least one of a probabilistic prediction and a score related to the entity event, and returning an advisory response to the online transaction system comprising the at least one of a probabilistic prediction and score so the at least one business entity can use the advisory responses to make business decisions regarding the entity events; and
allowing the user to optimize the PI artifacts by saving past entity events as entity event replicas and processing the entity event replicas using modified versions of one or more of the event API, the types, component modules and the behavior bundles for experimentation.

* * * * *